United States Patent Office 3,311,569
Patented Mar. 28, 1967

3,311,569
METHOD OF MAKING HALOGEN MODIFIED
POLY(ALKYLENE OXIDE) RESINS
Keith L. Smith and Alfred E. Winslow, Charleston, Howard R. Guest, Scott Depot, and Ben W. Kiff, Ona, W. Va., assignors to Union Carbide Corporation, a corporation of New York
No Drawing. Filed Oct. 19, 1962, Ser. No. 231,853
7 Claims. (Cl. 260—2)

This invention relates to halogenated poly(alkylene oxide) resins as new compositions of matter, and to processes for their production.

This application is a continuation-in-part of an application entitled, "Halogen Modified Poly(Alkylene Oxide) Resins," Ser. No. 668,306, filed June 27, 1957, by K. L. Smith, A. E. Winslow, H. R. Guest and B. W. Kiff, now abandoned.

High molecular weight solid alkylene oxide polymers and copolymers can be produced in the presence of polymerization catalysts such as those disclosed in U.S. Patent 2,971,988 and in the application of F. N. Hill, J. T. Fitzpatrick and F. E. Bailey, Jr., entitled, "Polymerization of Epoxides and New Products Obtained Thereby," Ser. No. 587,955, filed May 29, 1956, now abandoned, and "Polymerization of Epoxides," Ser. No. 783,185, filed Dec. 29, 1958, and now U.S. Patent 3,167,519.

The poly(alkylene oxide) resins obtained by the use of the catalysts disclosed in the above patent and applications are high molecular weight solid products having reduced viscosities up to about 100, or higher, when measured at a concentration of 0.2 gram in 100 ml. of acetonitrile at 30° C., and 5 percent aqueous bulk solution viscosities up to about 1,000,000, or higher, when measured at two revolutions per minute on a Model RVF Brookfield Viscometer at a temperature of about 25° C. As is known, the reduced viscosity of a polymer is regarded as an indication of its molecular weight, and is obtained by dividing the specific viscosity by the concentration of the polymer solution, the concentration being measured in grams of polymer per 100 ml. of solvent; the specific viscosity is obtained by dividing the difference between the viscosity of the solution and the viscosity of the pure solvent by the viscosity of the pure solvent.

The poly(alkylene oxide) resins are useful as thickeners, sizes and binders; and in the production of molded articles and films.

The present invention provides a means whereby a high molecular weight solid polymer or copolymer having a high reduced viscosity and a high aqueous bulk solution viscosity can be treated with a halogenating agent such as, for example, a halogen, or a halogen-liberating compound to produce a wax-like to resinous solid partially halogenated product having an average molecular weight lower than that of the starting polymer.

Among the poly(ethylene oxide) polymers and copolymers which are further treated in accordance with the process of this invention are those produced employing the catalysts disclosed in the above-mentioned patent and applications. These catalysts are the amides of the metals of Group II of the Periodic Table with atomic numbers greater than 19 and less than 57, the hexammoniates of calcium, strontium, and barium, and the decomposition products of the hexammoniates of calcium, strontium, and barium which contain only the alkaline earth metal, nitrogen, and hydrogen.

The amides of calcium, strontium, and barium can be made by reacting the metal with liquid ammonia. However, the product immediately obtained is not the amide but is a hexammoniate which can be symbolized by the formula $M(NH_3)_6$ wherein M can be Ca, Sr or Ba. The hexammoniates decompose with the evolution of hydrogen and ammonia to form the corresponding amides, $M(NH_2)_2$.

The amides of Zn, Cd, and Ba can be made by utilizing the known reaction between potassium amide and the bromide of the appropriate metal, the reaction being carried out in liquid ammonia. Zinc amide can also be prepared by reacting diethyl zinc with ammonia, the reaction giving zinc amide and ethane as the products. Methods for preparing the amides are also shown in the articles of Bergstrom and Fernelius in Chem. Revs., 12, 43 (1933) and in Chem. Revs., 20, 413 (1937).

The useful catalytic activity of the amides, the hexammoniates, and the decomposition products of the ammoniates containing the metal, nitrogen and hydrogen is quickly destroyed on exposure to air, the amides being pyrophoric. All preparations should be carried out under conditions whereby water, oxygen, and other gases reactive with the metal or the amides are substantially excluded. Likewise, all operations after the preparation of these catalysts should be carried out under an inert atmosphere such as oxygen-free, dry nitrogen or in an inert liquid such as mineral oil, or the diethyl ether of diethylene glycol.

These catalysts are used in concentrations ranging from about 0.02 part to 10 parts per each 100 parts by weight of alkylene oxide, though higher or lower ratios of catalyst to epoxide can be employed, if desired. The preferred range of ratios of catalyst to ethylene oxide is from about 0.1 part to 3 parts of catalyst per each 100 parts by weight of ethylene oxide. When these catalysts are employed, reaction temperatures as low as −30° C. and as high as 150° C. can be used. The preferred reaction temperature with these catalysts is from about 0° C. to 150° C.

The alkylene oxide polymers and copolymers can be made by bulk polymerization methods and by polymerization in various diluents.

One such group of diluents is that in which benzene, the alkyl substituted benzenes, and the nuclearly chlorinated benzenes are found. These diluents include benzene, toluene, xylene, ethyl benzene, chlorobenzene, and other similar aromatic liquids.

Another group of diluents is found in the hydrocarbon ethers; the ethers can be either aromatic in nature or saturated aliphatic hydrocarbon ethers. Olefinic and acetylenic unsaturation is to be avoided. Ethers which can be satisfactorily used are exemplified by ethers such as anisole, diethyl ether, di-n-butyl ether and the dimethyl, diethyl and dibutyl ethers of glycols such as ethylene glycol, propylene glycol and diethylene glycol, as well as the other similar ethers, and diethers.

A third group of diluents which can be employed in producing the copolymers is the normally-liquid saturated hydrocarbons including the straight and branched chain, cyclic, and alkyl substituted cyclic saturated hydrocarbons. Such diluents are exemplified by pentane, hexane, heptane, various normally-liquid petroleum hydrocarbon fractions, cyclohexane, the alkyl substituted cyclohexanes, and decahydronaphthalene.

The polymers suitable for use as starting materials in this invention are the homopolymers such as poly(ethylene oxide) and poly(propylene oxide), and the copolymers of ethylene oxide, with another polymerizable epoxide compound.

In carrying out the process of this invention, the high molecular weight resin is reacted with a halogenating agent, for example, a halogen in a gaseous, liquid or solid state, such as fluorine, chlorine, bromine or iodine, or a halogen-liberating compound, for example, an alkali metal hypochlorite or alkaline earth metal hypochlorite, such as sodium hypochlorite or calcium hypochlorite. The resin can be treated as an aqueous slurry, or as a suspension of the polymer in an organic liquid medium which will not react with the halogen under the reaction conditions, for example, heptane, carbon tetrachloride, chloroform, etc., or the resin can be treated in the dry state using a finely divided resin powder when the halogenating agent employed is one of the halogens or a hydrogen halide.

When one of the hypochlorites is used as the halogenating agent, the resin is best treated in the presence of water. For example, the dry resin and metal hypochlorite are intimately mixed and then added to water; or the dry resin can be added to an aqueous solution of the metal hypochlorite.

Because the reaction is a rapid one, there is no need to employ elevated temperatures. The reaction is preferably started at about room temperature, and the exothermic heat of reaction may increase the temperature about 10° to 20° C., or more. The reaction can be carried out at subatmospheric, atmospheric, or superatmospheric pressures. Neither temperatures nor pressure appear critical; but it is preferred to operate at such temperature that the resin is not in a molten or fused state.

When the resin is treated with a halogen by the methods of this invention as a slurry in an inert liquid, the gaseous halogenating agent is simply bubbled through while the slurry is stirred. The same procedure can be followed when the resin is in the dry powder form, i.e., the finely divided resin is stirred as the gas is passed through or over the dry resin bed. The halogenating gas may be in a pure form, or it may be diluted with an inert gas such as nitrogen, carbon dioxide, helium, argon, or filtered air. The use of diluted gas is preferred to obtain better control of the reaction and to prevent formation of hot-spots in the resin bed, which result in the formation of highly degraded, off-color, viscous liquid products. The extent to which the halogenating agent is diluted is a matter of choice depending on how fast one wished the reaction to proceed, and how efficient the mixing apparatus is.

The reaction is preferably completed within one hour. If the contact time with halogen atom is substantially increased above this limit, the products obtained have relatively poor strength, elongation and hardness. Generally it has been found that a poly(ethylene oxide) having a reduced viscosity in acetonitrile between about 15 and 100 can be reduced in viscosity to the desired viscosity range of from about 1 to about 10 in reaction times between 5 minutes and one hour if the chlorine content is held to a total concentration of 3 percent or less on the weight of the resin treated. Where the product desired is one which gives solutions with little or no pituitousness, i.e., a solution which is not stringy or mucus-like, it will be necessary to expose the resin to the chlorine gas at this concentration for at least 15 minutes, since resin giving pituitous solutions is produced at almost all viscosity levels when chlorine exposure is short.

When the resin is treated with a metal hypochlorite by the methods of this invention, it has been found that the reduced viscosity can be decreased either by using an aqueous solution or slurry of the reaction mixture, or by stirring the mixture of dry resin and hypochlorite in a moisture-containing atmosphere, for example, in the presence of small amounts of water vapor. By this latter means one obtains a dry, powdery product. The amount of hypochlorite used can vary from about 0.5 part to about 10 parts per 100 parts of resin. Preferably, from about 1.0 to about 4.0 parts per 100 parts of resin is used.

However, the amount of halogenating agent required cannot be specifically defined since it is dependent upon the aqueous bulk solution viscosity desired in the halogenated polymer produced. It has been found that the amount of catalyst residue present in the resin affects the amount of halogenating agent needed to reduce the resin viscosity. In general, the higher the catalyst residue content, the greater is the amount of halogenating agent needed to reduce the resin viscosity to a given level. Ordinarily the amount of halogenating agent required is about equivalent to the amount needed to convert the metal atom of the catalyst residue to its corresponding metal chloride salt.

A wide range of products is obtainable by the process of this invention ranging from resins having a 5 percent aqueous bulk solution viscosity of at least about 10 cps. and, up to about 500,000 cps., or higher. The preferred range is from about 50 cps. to about 10,000 cps. It must be remembered that in all instances one starts with a resin having a solution viscosity higher than that of the final product obtained. The advantages to be obtained by this invention are that one can produce high molecular weight resins by processes which give high yields in short reaction times, and this resin can then be treated with a halogenating compound to reduce the molecular weight to the desired range by an easily controllable process, also within a short period of time.

In the following table a comparison between reduced viscosity in acetonitrile at 30° C. and 5 percent aqueous bulk solution viscosity at about 25° C., as determined experimentally using poly(ethylene oxide), is set forth:

| Reduced viscosity, 0.2 g. resin/100 cc. acetonitrile: | 5 percent aqueous bulk viscosity, cps. |
|---|---|
| 1.2 | 50 |
| 1.9 | 100 |
| 2.5 | 200 |
| 3.1 | 500 |
| 3.4 | 1,000 |
| 5.0 | 5,000 |
| 6.1 | 10,000 |
| 7.7 | 20,000 |
| 8.9 | 30,000 |
| 9.9 | 40,000 |
| 10.9 | 50,000 |

In a typical example, wherein a finely ground dry poly(ethylene oxide) is treated with chlorine gas, the resin is placed in a flask, and while the resin bed is being stirred, a chlorine-nitrogen mixture is blown into the flask and the resin is kept in contact with the chlorine for several minutes. The flask is then purged with nitrogen to drive off unreacted excess chlorine and finally the flask and its contents are purged with anhydrous ammonia gas to neutrailze any residual ammonia. The resin so treated will have a molecular weight, as indicated by measurement of its reduced viscosity in acetonitrile, or from its aqueous bulk solution viscosity, lower than the molecular weight of the starting poly(ethylene oxide).

As indicated in this typical example, ammonia gas may be used to neutralize any residual halogen present, and thus prevent any further decrease in viscosity. Other neutralizing agents can also be used, for example, organic amines such as di-2-ethylhexylamine, triethanolamine, ethylenediamine, and the like. The halogen can be added all at once, or it can be purged in slowly; and the resin bed, or the atmosphere above it, or both may be agitated or stagnant, as will be further brought out in the appended examples. When the halogenating agent is an alkali metal hypochlorite or an alkaline earth metal hypochlorite, neutralization is not necessary since there is no acidic residue remaining in the treated resin mass.

When the resin is treated with halogen, the presence or absence of moisture is generally not critical, and equivalent results were obtained using dry or moisture-containing poly(ethylene oxide) samples. On the other hand, when the resin is treated with a hypochlorite the resin is not substantially reduced in viscosity unless water is present.

We refer to the product obtained as a halogenated poly(alkylene oxide) since the products are found to contain halogen. However, it has not yet been possible to determine the manner in which the halogen atom is present. For example, it may be directly attached to the carbon atoms of the poly(alkylene oxide), or it may be attached to the calcium atom which in turn is attached to the poly(alkylene oxide) chain, or it may merely be adsorbed on the surface of the resin in the form of calcium chloride. Definite proof as to the manner in which it is present is difficult of ascertainment because of the difficulties encountered in analyzing high molecular weight resins.

After the halogenating treatment, small amounts of anti-oxidants, stabilizers, or other materials may be added by conventional procedures which are well known in the art, for example, by dry-blending, the use of slurries, or by spraying.

The pituitous nature of the resin is measured quantitatively in a Du Noüy Tensiometer used normally for determining the surface tension of liquids. The surface tension is run in the usual manner, and then the liquid "string" which forms between the tensiometer ring and the solution surface is observed. The time in seconds between formation of this "string" and its spontaneous rupture is reported as the pituitousness rating of the solution.

The solution used in determining the aqueous bulk solution viscosity was generally prepared by dissolving 25.0 grams of the treated resin with 475.0 grams of distilled water by stirring at room temperature with 3 inch turbine mixed about 150 r.p.m.

The following examples further serve to illustrate this invention.

Example 1

A 75 gram portion of poly(ethylene oxide), which had a reduced viscosity of 42.2 when measured at a concentration of 0.2 gram in 100 ml. of acetonitrile at 30° C., a chlorine content of 0.07 percent and a 5 percent aqueous bulk solution viscosity at about 25° C. of 390,000 cps., as measured at two revolutions per minute on a Model RVF Brookfield Viscometer, was slurried in a mixture of 750 grams of heptane, 15 grams of distilled water and 8.4 grams of "Tergitol NPX," an alkyl phenyl polyethylene glycol ether wetting agent. The slurry was heated to 38° C. and chlorine gas was bubbled through. An immediate exothermic reaction occurred and external heating was discontinued. The chlorine flow was stopped and the reaction mixture, due to the exothermic heat, refluxed at 55 to 60° C. for about 15 minutes and then slowed down. The mixture was cooled with an ice bath and the resin was filtered from the heptane. The chlorinated poly(ethylene oxide) was waxy and light green in color, and had a 5 percent aqueous bulk solution viscosity of less than about 50 cps.

Example 2

A 70 gram portion of the same poly(ethylene oxide) starting material used in Example 1 was slurried in 700 grams of carbon tetrachloride in a two liter resin flask. Chlorine gas was bubbled into the slurry at 22° C. through a gas diffuser for 3 minutes. During this period the color of the mixture became yellow, and the temperature rose to 28° C. Chlorine input was stopped, and the mixture was stirred for an additional 20 minutes, and then purged with nitrogen until gaseous chlorine was no longer detectable in the reaction vessel. Nitrogen was then bubbled through the slurry for an additional 30 minutes. This was followed by anhydrous ammonia for 30 minutes, during which time the yellow color disappeared from the reaction mixture. The chlorinated poly(ethylene oxide) was filtered and dried. The product had a chlorine content of 1.4 percent a 5 percent aqueous bulk solution of 75 cps.

This example was repeated with a 2 minute chlorine addition period followed by an additional 8 minutes stirring and a 20 minute nitrogen purge and 25 minute ammonia purge. The carbon tetrachloride was decanted and the resin was reslurried in about 700 grams of fresh carbon tetrachloride and neutralized with ammonia for an additional 10 minutes. The chlorinated poly(ethylene oxide) had a 5 percent aqueous bulk solution viscosity of 45 cps., and a 10 percent aqueous bulk solution viscosity of 260 cps.

Example 3

A 3 inch deep layer of the same poly(ethylene oxide) starting material used in Example 1 was placed loosely in a 2 inch diameter coarse mesh sintered glass funnel, which has been modified by adding 4 inches to the length of the well. Chlorine gas was bubbled into the resin bed through the funnel's outlet tube for 8 minutes until the resin was saturated with chlorine. The chlorine was turned off and the resin was allowed to stand for 12 minutes. The resin bed was then purged with nitrogen for 10 minutes and ammonia for 5 minutes. The chlorinated resin could be separated into three fractions; a brown, gummy material in the middle of the bed, a white granular fraction, and a tan granular fraction. The white fraction had a 5 percent aqueous bulk solution viscosity of less than 10 cps.

Example 4

A 100 gram portion of the same poly(ethylene oxide) starting material used in Example 1 was spread evenly to a depth of about one inch over the bottom of a battery jar approximately 10 inches in diameter by 10 inches high, the top of which was covered to hinder the escape of gas. The battery jar was purged with nitrogen gas for one minute through a hole in the cover, and then chlorine was passed into the container long enough to make a stagnant layer on top of the resin. This required 15 seconds. The chlorine was in contact with the resin for 1 minute after which the container was flushed with nitrogen and then neutralized with anhydrous ammonia for one minute.

This example was repeated varying the contact time of the resin with the chlorine. The results are tabulated below.

| Contact time, min | 1 | 2 | 3 | 5 |
| --- | --- | --- | --- | --- |
| 5 percent aqueous bulk solution viscosity, cps.: | | | | |
| No aging | 3,460 | 4,800 | 160 | 85 |
| 3 days aging | 3,480 | 5,000 | 160 | ----- |
| 7 days aging | 2,840 | 4,060 | 145 | ----- |
| pH, without aging | 9.47 | 9.06 | 8.39 | 8.69 |
| Pituitous rating, sec | 0.5 | 0.8 | 0 | ----- |

Example 5

Two hundred grams of poly(ethylene oxide) having a 5 percent aqueous bulk solution viscosity of 184,000 cps. was placed in a 3.156 liter glass reaction flask mounted on a laboratory rotary vacuum evaporator which was connected to a special cold trap containing bromine. The reactor flask was evacuated at a pressure of about 3 inches of mercury for about 2 minutes and then 5.1079 grams of bromine were transferred from the cold trap to the reaction vessel while the reaction vessel was being rotated. The cold trap was warmed slightly to facilitate the transfer. The resin turned a uniform golden color as the bromine made contact with it. The resin was exposed to bromine for 30 minutes at room temperature, after which anhydrous ammonia gas was charged to the reaction vessel, causing the resin to change to a completely white color. The brominated poly(ethylene oxide) had a 5 percent aqueous bulk solution viscosity of 18,600 cps.

Example 6

Two hundred grams of the same poly(ethylene oxide) starting material used in Example 5 was placed in a three liter glass reaction flask mounted on a laboratory rotary vacuum evaporator containing 20 grams of pulverized, resublimed reagent grade iodine. The rotary evaporator was started turning, and the reaction flask was evacuated to a pressure of about 3 inches of mercury with vacuum applied for 2 minutes. Evacuation was stopped and the reaction vessel was rotated at room temperature at the reduced pressure for 30 minutes. The deep brown colored iodinated poly(ethylene oxide) was washed four times with anhydrous acetone leaving a faintly colored resin, which had a 5 percent aqueous bulk solution viscosity of 52,500 cps.

Example 7

Two hundred grams of the same poly(ethylene oxide) starting material used in Example 5 was placed in a steel cylinder having an approximate volume of 1200 ml. The resin was exposed to 5 grams of hydrogen fluoride for 30 minutes at 25° C. At the end of this time the excess hydrogen fluoride gas was purged from the cylinder with nitrogen, followed by a purge with anhydrous ammonia gas. The fluorinated poly(ethylene-oxide) had a 5 percent aqueous bulk solution viscosity of 610 cps.

Example 8

Two hundred grams of the same poly(ethylene oxide) starting material used in Example 5 was placed in a three liter glass reaction flask mounted on a laboratory rotary vacuum evaporator and exposed to 2.6866 grams of gaseous chlorine for 30 minutes while turning the rotary evaporator. At the end of this time the flask was purged with anhydrous ammonia gas. The chlorinated poly(ethylene oxide) had a 5 percent aqueous bulk solution viscosity of 5,260 cps.

One hundred grams of the above chlorinated poly(ethylene oxide) was further treated in the rotary vacuum evaporator with 1.7293 grams in the manner described in Example 5. The resin was exposed to the bromine for 60 minutes, and then the flask was purged with anhydrous ammonia gas. The treated resin has a 5 percent aqueous bulk solution viscosity of 1,050 cps.

Example 9

Using the same equipment as described in Example 4, chlorine gas was continuously purged into the battery jar containing 100 grams of the same poly(ethylene oxide) starting material used in Example 4, for one and two minute periods. The jar was then purged with nitrogen gas followed by anhydrous ammonia neutralization. The results are tabulated below:

| Contact time, min | 1 | 2 |
|---|---|---|
| 5 percent aqueous bulk solution viscosity, cps.: | | |
| No aging | 180 | 40 |
| 3 days aging | 150 | 30 |
| pH, without aging | 8.62 | 8.56 |
| Pituitous rating | 0 | 0 |

Example 10

A 10 inch diameter battery jar having a volume of 11.45 liters was covered with a metal cover and taped around the edges after having evenly spread one hundred grams of the same poly(ethylene oxide) starting material used in Example 1 over the bottom of the jar and the jar was purged with nitrogen gas. A separatory funnel having a volume of 4.471 liters and equipped with stopcocks at either end was filled with chlorine gas by air displacement at room temperature and atmospheric pressure. The separatory funnel was connected to the battery jar containing the resin and the chlorine gas was forced into the jar by applying nitrogen pressure to the other end of the separatory funnel. The resin remained in contact with the stagnant chlorine-nitrogen gas mixture for 2 minutes. The jar was then purged with nitrogen for one minute followed by anhydrous ammonia gas for one minute.

Several runs were made employing a 2.444 liter volume of chlorine. Results are listed below:

| Run | Volume of Chlorine added | Contact time, min. | 5% Aqueous Bulk Solution Viscosity, cps. | pH |
|---|---|---|---|---|
| a | 4.471 | 2 | 1,160 | 8.75 |
| b | 4.471 | 2 | 610 | 8.71 |
| c | 4.471 | 2 | 1,140 | 9.02 |
| d | 4.471 | 5 | 163 | 8.60 |
| e | 4.471 | 3 | 470 | 8.49 |
| f | 4.471 | 2 | 4,320 | 9.31 |
| g | 4.471 | 2 | 680 | 9.02 |
| h | 4.471 | 10 | 120 | |
| i | 2.444 | 10 | 495 | |
| j | 2.444 | 15 | 120 | |
| k | 2.444 | 5 | 430 | |
| l | 2.444 | 3 | 8,760 | |

Pituitous rating of (a) to (e) was 0; (f) had a rating of 0.5 and (g), a rating of 0.9.

The physical properties of several of the chlorinated poly(ethylene oxide) products were obtained and compared with the properties of the starting material.

| | Untreated | Composite of a and c | g | Composite of h and j |
|---|---|---|---|---|
| Tensile strength, p.s.i. (Scott tester L-6) | 4,920 | 3,600 | 2,800 | |
| Elongation, percent (Scott tester L-6) | 685 | 1,015 | 1,000 | 20 |
| Load at 100% elongation, p.s.i. (Scott tester L-6) | 1,740 | 1,975 | 1,925 | |
| Stiffness, p.s.i. (ASTM D-747-50) | 49,000 | 50,000 | 53,000 | 55,000 |
| Brittle temperature, ° C. (ASTM D-746-55T) | −50 | −50 | −52 | −46 |
| Hardness, Durometer "D" | 56 | 56 | 55 | 55 |
| Melt index (at 190° C., 43.1 p.s.i.) | 0 | 0.2 | 0.2 | 0.95 |
| Flow rate (at 190° C., 208.5 p.s.i.) | 0 | 1.5 | 2.8 | 85 |

Example 11

The same procedure and equipment described in Example 10 were employed using chlorine gas volume of 2.444 liters, with the exception that a stainless steel turbine impeller was suspended in the battery jar above the resin and operated at about 350 r.p.m. during the time that the resin was in contact with the chlorine-nitrogen gas mixture. Results are tabulated below:

| Contact time, min | 3 | 5 | 10 | 15 |
|---|---|---|---|---|
| 5 percent aqueous bulk solution viscosity, cps.: | | | | |
| No aging | 2,890 | 1,890 | 395 | 145 |
| 7 days aging | 1,490 | 795 | 275 | 115 |

Example 12

Two hundred grams of poly(ethylene oxide) which had a reduced viscosity of 37.6 when measured at a concentration of 0.2 grams in 100 ml. of acetonitrile at 30° C. and 5 percent aqueous bulk solution viscosity of 640,000 cps., was placed in a 3 liter round bottom three-neck flask. The flask was evacuated to a pressure of about 3 inches of mercury and 2.444 liters of chlorine gas (measured as described in Example 10) was transferred to the flask by connecting the separatory funnel to the flask and allowing the two vessels to reach pressure equilibrium. The flask was sealed off, placed in a pasteboard container and agitated by rolling on a set of can rolls for 25 minutes. The chlorine was purged from the flask with nitrogen for one minute and then the flask was purged with anhydrous ammonia gas for an additional minute. The physical properties of this chlorinated poly(ethylene oxide) are compared with those of the untreated resin in the following table.

| Resin | Untreated | Treated |
|---|---|---|
| 5% Aqueous bulk solution viscosity, cps. | 640,000 | 440 |
| Tensile strength, p.s.i. | 3,825 | 1,700 |
| Elongation, percent | 675 | 125 |
| Load at 100% elongation, p.s.i. | 1,675 | 1,700 |
| Stiffness, p.s.i. | 49,000 | 44,000 |
| Brittle temperature, °C | −52 | −50 |
| Durometer hardness, "D" | 56 | 55 |
| Melt index (at 190° C., 43.1 p.s.i.) | 0 | 0.3 |
| Flow rate (at 190° C., 208.5 p.s.i.) | 0 | 4.8 |

Example 13

Poly(ethylene oxide) was treated with weighed amounts of liquid chlorine by the procedure described in Example 12. After having introduced the liquid chlorine to the reaction flask, the reaction vessel was vented to atmospheric pressure before rolling in the pasteboard container. The results are tabulated below:

TABLE A
[200 grams resin sample]

| Chlorine Added, g. | Contact time, min. | 5% Aqueous Bulk Solution Viscosity, cps. |
|---|---|---|
| 0 | 0 | 640,000 |
| 2.4895 | 15 | 525 |
| 3.0180 | 15 | 165 |
| 3.6381 | 15 | 75 |
| 1.6004 | 30 | 46,250 |
| 1.7277 | 30 | 25,400 |
| 1.7893 | 30 | 17,320 |
| 1.8306 | 30 | 15,400 |
| 2.4293 | 30 | 200 |
| 2.6152 | 30 | 180 |
| 3.0296 | 30 | 75 |
| 4.9543 | 30 | 25 |
| 1.4641 | 60 | 47,300 |
| 1.8370 | 60 | 25,100 |

TABLE B
[200 grams resin sample]

| Chlorine Added, g. | Contact time, min. | 5% Aqueous Bulk Solution Viscosity, cps. |
|---|---|---|
| 0 | 0 | >400,000 |
| 2.1007 | 15 | 27,600 |
| 2.3511 | 15 | 850 |
| 2.0705 | 30 | 2,530 |
| 2.1398 | 30 | 2,150 |
| 2.1944 | 30 | 1,670 |
| 2.3213 | 30 | 570 |
| 1.7887 | 60 | 15,540 |
| 2.0514 | 60 | 800 |
| 2.1170 | 60 | 1,200 |
| 2.1909 | 60 | 620 |
| 2.3487 | 60 | 175 |
| 2.7372 | 60 | 160 |

[300 grams resin sample]

| Chlorine Added, g. | Contact time, min. | 5% Aqueous Bulk Solution Viscosity, cps. |
|---|---|---|
| 3.9173 | 15 | 150 |
| 2.5151 | 30 | 18,700 |
| 3.0857 | 30 | 500 |
| 3.5633 | 30 | 4,180 |
| 3.5828 | 30 | 120 |
| 3.0843 | 60 | 265 |

[500 grams resin sample]

| Chlorine Added, g. | Contact time, min. | 5% Aqueous Bulk Solution Viscosity, cps. |
|---|---|---|
| 3.8155 | 60 | 31,000 |
| 5.3992 | 60 | 1,535 |
| 5.7804 | 60 | 170 |
| 8.6978 | 60 | 50 |

Example 14

The laboratory rotary vacuum evaporator referred to in prior examples was modified so that gas could be introduced to the rotating resin bed while this bed was being continuously agitated. Two hundred gram samples of poly(ethylene oxide) having a reduced viscosity of 63.5 when measured at a concentration of 0.2 gram in 100 ml. of acetonitrile at 30° C. and a 1 percent aqueous bulk solution viscosity of 8,150 cps. were placed in the reactor flask and chlorine was allowed to flow continuously through the flask during the duration of the exposure cycle while the flask was rotating. At the end of this time anhydrous ammonia gas was flushed through the rotating resin bed in the same manner followed by a one minute nitrogen purge. The results are tabulated in the following table:

| Contact Time, Min. | 5% Aqueous Bulk Solution Viscosity, cps. | Tensile Strength, p.s.i. | Pituitous Rating, sec. | Elongation, Percent |
|---|---|---|---|---|
| 0 | | 4,200 | | 630 |
| 1 | 3,690 | 2,875 | | 835 |
| 1.5 | 1,570 | | 5.5 | |
| 1.5 | 1,690 | 2,775 | 3.5 | 910 |
| 1.75 | 2,155 | | | |
| 2 [1] | 330 | 1,850 | 1.9 | 30 |
| 2 | 555 | 1,800 | 3.9 | 50 |
| 2 | 655 | | | |
| 2.5 | 325 | 1,800 | 2.8 | 20 |
| 3 | 110 | 1,800 | 0.8 | 20 |

[1] Reaction vessel was not rotated in this experiment.

Example 15

The laboratory rotary vacuum evaporator referred to in prior examples was charged with 200 grams of the same poly(ethylene oxide) used in Example 5. A partial vacuum was pulled on the flask and 3.7817 grams of chlorine were vaporized into the reaction vessel. Then the system was vented to the air to allow the flask to come to atmospheric pressure and the flask was rotated for 30 minutes at room temperature. At the end of this period of time the system was evacuated for 15½ hours to remove unreacted chlorine. The chlorinated poly(ethylene oxide) was analyzed and contained 1.0 percent chlorine. The resin had a 5 percent aqueous bulk solution viscosity of 220 cps. A 40 gram sample was dissolved in acetonitrile and filtered to remove insoluble impurities. The resin was recovered from this solution, and again analyzed for chlorine, chlorine content was 0.97 percent.

*Example 16*

A blend of 197 grams of poly(ethylene oxide), which had a reduced viscosity of 38 and a 5 percent aqueous solution viscosity of about 425,000 cps., and 2.7 g. of commercial calcium hypochlorite containing 70 percent available chlorine, was prepared by rolling in a bottle overnight. The next day a 5 percent aqueous solution was prepared, which had a viscosity of 8,000 cps.

Additional runs were performed in the same manner but varying the concentration of the hypochlorite charged. All of the results are tabulated below:

| Run | a | b | c |
|---|---|---|---|
| Parts resin | ¹ 197 | ² 10 | ² 10 |
| Hypochlorite, g | 2.7 | 68 | 77.2 |
| Hypochlorite, percent | 1.35 | 1.5 | 1.7 |
| 5% Aqueous solution viscosity, cps | 8,000 | 671 | 320 |

¹ Grams.
² Pounds.

*Example 17*

A solution was prepared of 0.38 gram of the same calcium hypochlorite used in Example 16 in 475 grams of water. Then 24.68 grams of the same poly(ethylene oxide) used in Example 16 was added to the solution to form a 5 percent aqueous solution of the resin and the mixture was stirred for one hour.

Another run was performed in the same manner but varying the hypochlorite concentration. Results are tabulated below:

| Run | a | b |
|---|---|---|
| Water, g | 475 | 475 |
| Hypochlorite, g | 0.38 | 0.425 |
| Hypochlorite, percent | 1.52 | 1.73 |
| Resin, g | 24.68 | 24.58 |
| 5% Aqueous solution viscosity, cps | 317 | 162 |

*Example 18*

A solution was prepared of 7.5 grams of a 5.25 percent by weight commercial sodium hypochlorite solution and 942 grams of water. While the mixture was stirred 50 grams of the same poly(ethylene oxide) used in Example 16 were added at room temperature and stirred for about 77 minutes.

Another run was performed in the same manner but using a different amount of sodium hypochlorite. The results are tabulated below:

| Run | a | b |
|---|---|---|
| Water, g | 942 | 940 |
| Hypochlorite solution, g | 7.5 | 10 |
| 5% Aqueous solution viscosity, cps | 5,360 | 183 |

*Example 19*

A sample of 2,236 pounds of a blend of several batches of finely divided poly(ethylene oxide) resin having an average molecular weight of about 3,000,000 was treated with 21.9 pounds of gaseous chlorine in a conical glass lined rotating blender under conditions similar to those described in the previous examples. The 1 percent by weight aqueous solution viscosity of the starting materials making up the blend was in the range of 1,000 to 3,000 centipoise at 25° C. After treatment with the chlorine the product had a 5 percent by weight aqueous solution viscosity of 240 centipoise at 25° C. The product in the blender was neutralized with ammonia vapor and then 64.4 pounds of a 50 percent by weight acetone solution of monomethyl ether of hydroquinone was added as stabilizer. Subsequently, the product was dried under a partial vacuum at a temperature of about 45° C. This material had a chlorine content of 1.43 percent by weight and it had a reduced viscosity of 2.4 determined with a Ubbelohde viscometer at 30° C. and a concentration of 0.2 gram per 100 milliliters of aqueous solution. The halogenated product so formed was water soluble and could be molded into a plaque without any sign of deterioration. The plaque was opaque white in color and showed no evidence of hydrogen chloride evolution on standing.

In order to demonstrate the unexpected and surprising results obtained by the process of the instant invention in contrast to prior art procedures, various low molecular weight polyalkylene glycols were halogenated in accordance with known methods as set forth in Examples 20–22 below:

*Example 20*

A 200 gram portion of polyethylene glycol having an average molecular weight of about 1,500 was suspended in 600 grams of carbon tetrachloride. It was then treated with 42 grams of chlorine gas over a period of about 1¾ hours and at a temperature of from 52° C. to 63° C. as described in Example A of United States Patent No. 2,416,880. During the chlorination the reaction mixture was illuminated with light from a 100 watt tungsten lamp and at the end of the reaction a clear colorless solution was obtained. The reaction mixture was concentrated at a temperature of 25° C. and under a pressure to yield 408 grams of a very viscous syrup. The syrup was further dried for 3 days in a vacuum oven at room temperature and at an absolute pressure of 4 millimeters of mercury to yield a 199 gram elastomeric clear colorless film which analyzed for a chlorine content of 1.46 percent by weight. The reduced viscosity determined from an aqueous solution was described in Example 19 above was 0.11. The reduced viscosity of the starting material was 0.08.

The chlorine treated polyethylene glycol was also molded into a 5¼ inch diameter plaque and subsequently baked for one hour between sheets of "Teflon" coated glass cloth followed by a one-hour exposure to air, both of these periods being at 75° C. This treatment caused the product to turn a dark brown viscous gummy mass which would not retain its shape.

*Example 21*

A 200 gram portion of polyethylene glycol having an average molecular weight of about 4,000 was suspended in 800 grams of carbon tetrachloride and treated with 396 grams of chloride gas over a period of 4¼ hours and at a temperature of from 54° C. to 60° C. in a manner similar to that described in Example C of United States Patent No. 2,416,880. During the chlorine treatment the reaction mixture was illuminated with a 100 watt tungsten lamp. At the end of the reaction period the mixture was concentrated to yield 428 grams of a clear colorless very viscous syrup using a water bath at a temperature of about 55° C. and under a reduced pressure. The syrup was further dried for 19 hours in a vacuum oven at a temperature of 58° C. and an absolute pressure of 4 millimeters of mercury to yield 354 grams of a semisolid gummy product which analyzed for a chlorine content of 44.5 percent by weight. The reduced viscosity could not be determined since the product formed was water insoluble; the reduced viscosity of the starting material was 0.13 when determined from an aqueous solution as described above in Example 19. A room temperature molded disc prepared from a portion of the product, and subsequently subjected to reduced pressure while still at room temperature, rapidly decomposed to a dark brown, almost black product which was very friable. Its adhesion to "Teflon" disappeared as the halogenated product decomposed. There was a strong odor of residual hydrogen chloride.

Example 22

A 400 gram sample of polyethylene glycol having an average molecular weight of about 4,000 was suspended in 1,200 grams of carbon tetrachloride and 50 grams of chlorine gas was fed in over a one-hour period at a temperature of from 57° C. to 61.5° C. The reaction conditions were simiuar to those described in Example 20 above. During the reaction period the polyethylene glycol completely dissolved in the solvent. At the end of the reaction the solution was concentrated to yield a clear colorless somewhat viscous solution. Concentration was carried out at room temperature and at an absolute pressure of 10 millimeters to 20 millimeters of mercury. The viscous concentrate weighed 1,157 grams. A 141 gram portion of this viscous product solution was dried overnight in a vacuum oven at room temperature and at a pressure of 2 millimeters of mercury to yield a frangible white foamy product which analyzed for a chlorine content of 1.56 percent by weight. The reduced viscosity of an aqueous solution as determined by the procedure described previously was 0.37.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A process for reducing the reduced viscosity of a poly(lower-alkylene oxide) which comprises contacting a finely divided, resinous, poly(lower-alkylene oxide), selected from the group consisting of poly(ethylene oxide) and poly(propylene oxide), with a degrading agent, selected from the group consisting of halogen, alkali metal hypochlorite, and alkaline earth metal hypochlorite, to produce a solid poly(lower-alkylene oxide) having a halogen content of from about 0.1 to about 1.5 weight percent, based on the weight of said poly(lower-alkylene oxide), and a reduced viscosity of at least 1 when measured at a concentration of 0.2 gram of poly(lower-alkylene oxide) in 100 milliliters of acetonitrile at 30° C., said reduced viscosity being lower than that of the starting poly(lower-alkylene oxide).

2. The process of claim 1 wherein said degrading agent is fluorine.

3. The process of claim 1 wherein said degrading agent is chlorine.

4. The process of claim 1 wherein said degrading agent is bromine.

5. The process of claim 1 wherein said degrading agent is iodine.

6. A process for reducing the reduced viscosity of a poly(ethylene oxide) which comprises contacting finely divided, resinous poly(ethylene oxide) with chlorine to produce a solid poly(ethylene oxide) having a chlorine content of from about 0.1 to about 1.5 weight percent, based on the weight of said poly(ethylene oxide), and a reduced viscosity of at least 1 when measured at a concentration of 0.2 gram of poly(ethylene oxide) in 100 millimeters of acetonitrile at 30° C., said reduced viscosity being lower than that of the starting poly(ethylene oxide).

7. A process for reducing the reduced viscosity of a poly(ethylene oxide) which comprises contacting finely divided, resinous poly(propylene oxide) with chlorine to produce a solid poly(propylene oxide) having a chlorine content of from about 0.1 to about 1.5 weight percent, based on the weight of said poly(propylene oxide) and a reduced viscosity of at least 1 when measured at a concentration of 0.2 gram of poly(propylene oxide) in 100 milliters of acetonitrile at 30° C., said reduced viscosity being lower than that of the starting poly(propylene oxide).

References Cited by the Examiner

UNITED STATES PATENTS

| | | | |
|---|---|---|---|
| 2,416,880 | 3/1947 | Mortenson | 260—2 |
| 2,934,518 | 4/1960 | Smith | 260—2 |

FOREIGN PATENTS 572,767   10/1945   Great Britain.

WILLIAM H. SHORT, *Primary Examiner.*

S. N. RICE, *Assistant Examiner.*